Dec. 18, 1962  A. F. HICKMAN  3,069,184
SPRING SUSPENSION FOR TANDEM AXLE VEHICLES
Filed April 28, 1960  4 Sheets-Sheet 1

INVENTOR.
Albert F. Hickman
BY
Popp and Sommer
ATTORNEYS.

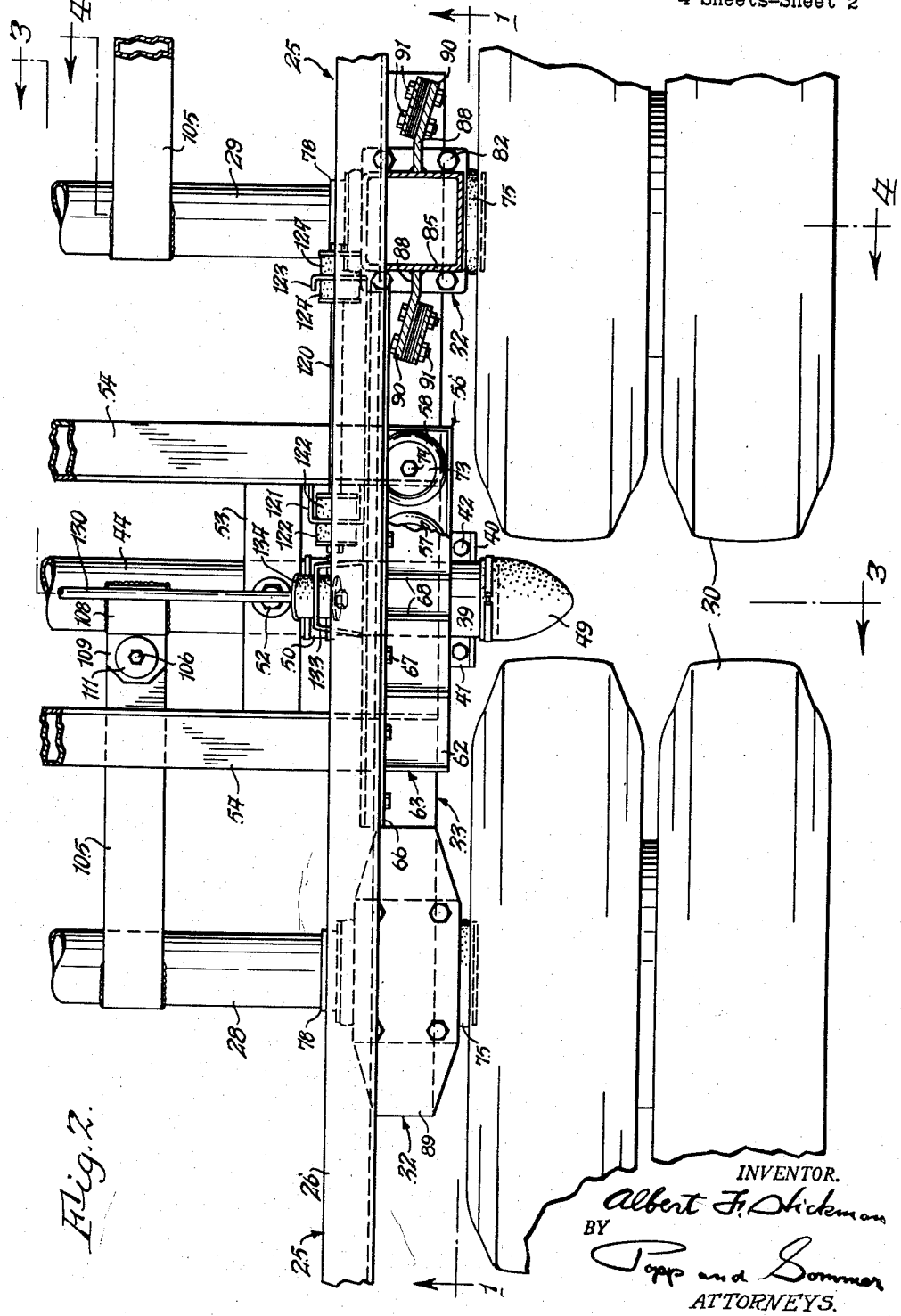

Dec. 18, 1962  A. F. HICKMAN  3,069,184
SPRING SUSPENSION FOR TANDEM AXLE VEHICLES
Filed April 28, 1960  4 Sheets-Sheet 3
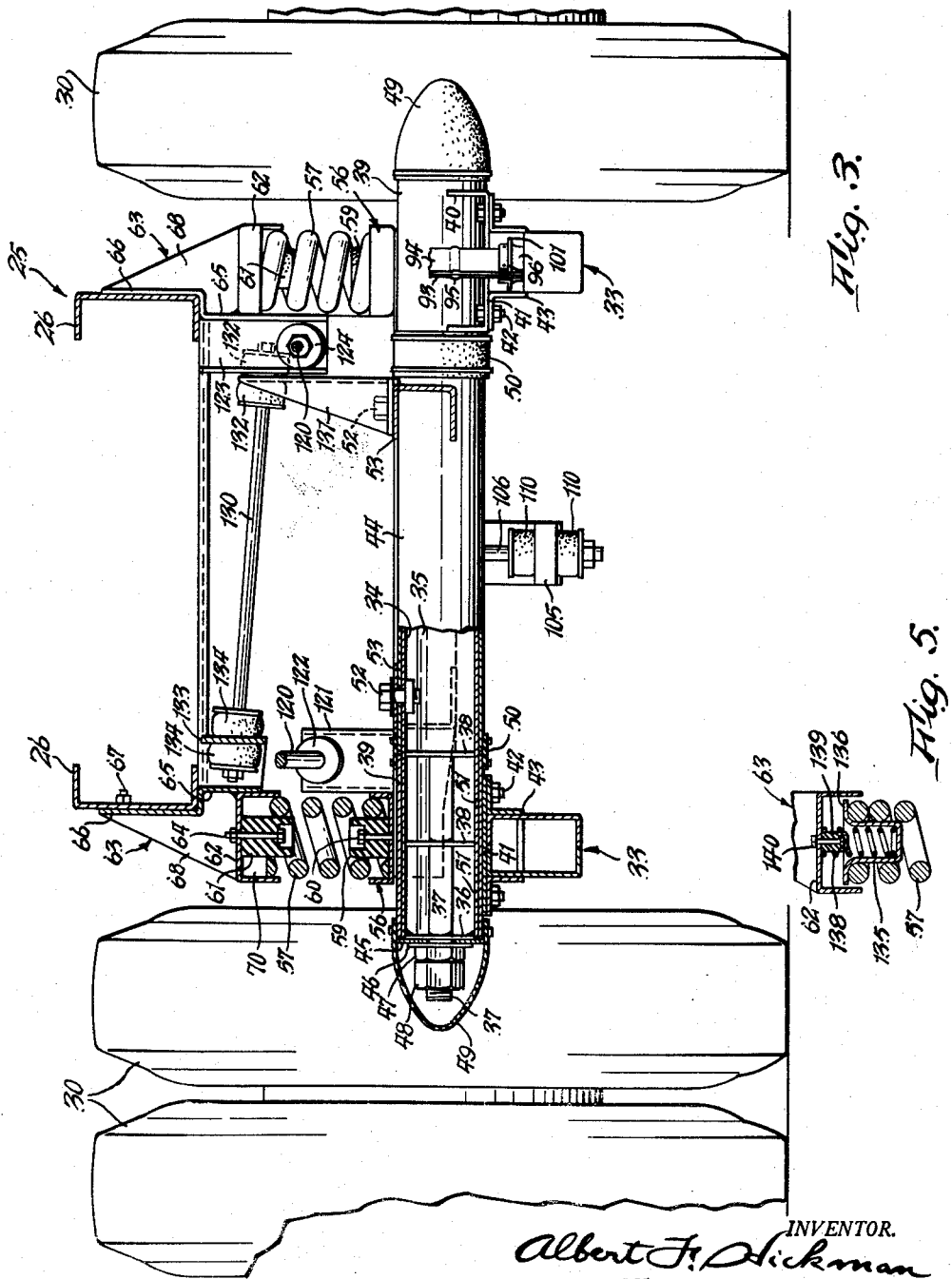
INVENTOR.
Albert F. Hickman
BY
Poppe and Sommer
ATTORNEYS.

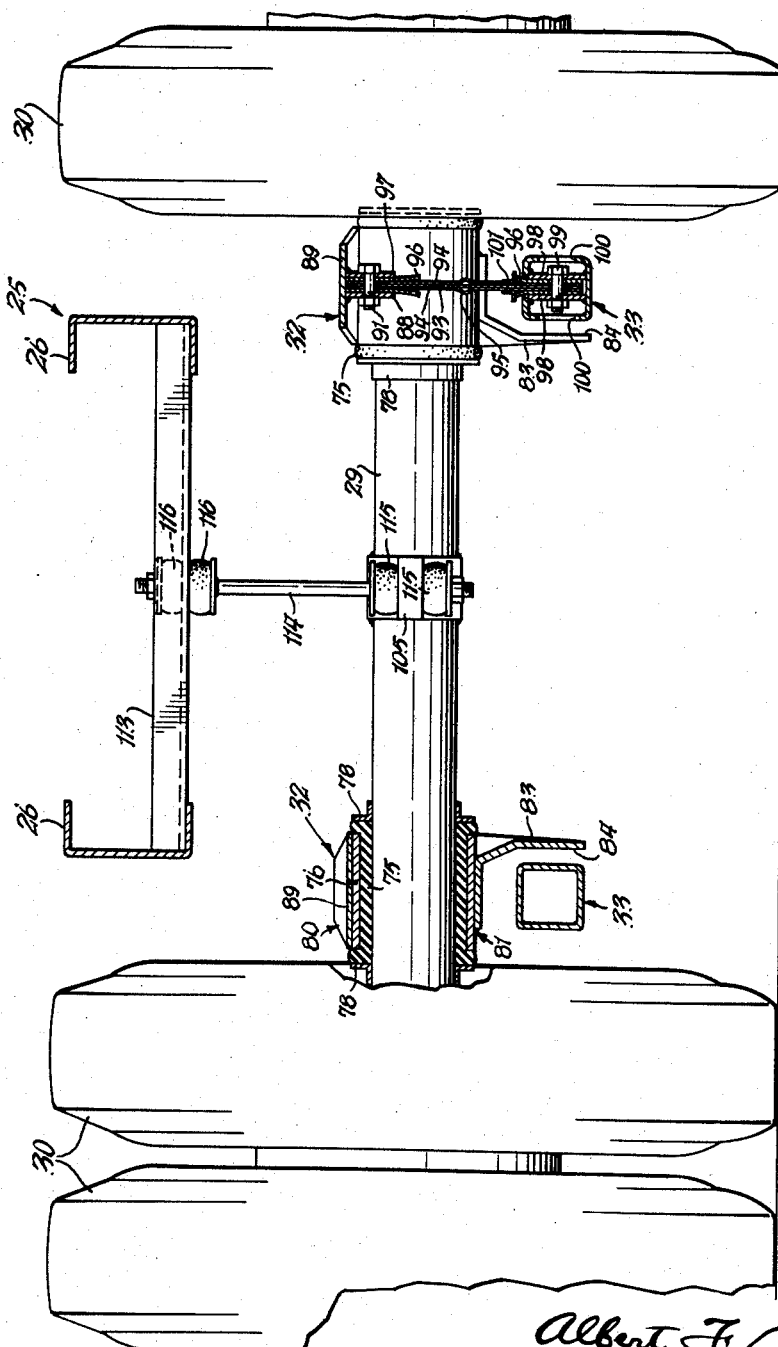

United States Patent Office 3,069,184
Patented Dec. 18, 1962

3,069,184
SPRING SUSPENSION FOR TANDEM AXLE VEHICLES
Albert F. Hickman, Eden, N.Y.
Filed Apr. 28, 1960, Ser. No. 25,445
11 Claims. (Cl. 280—104.5)

This invention relates to a tandem axle spring suspension for trucks, trailers and passenger buses and more particularly to such a suspension employing helical compression springs to provide the vertical cushioning.

This application is a companion to my copending application, Serial No. 794,083, filed February 18, 1959 for Tandem Axle Spring Suspension, now Patent No. 3,017,195.

In common with the said copending application, is an object of the present invention to provide a tandem axle suspension which is adapted for heavy duty trucks having wide bodies and dual tires with only a few inches of space between the body and each of the dual tires, and also heavy duty trucks with a so-called extended wheel base tandem suspension, such extended wheel base tandem axles being required to carry maximum loads in certain states and having a wheel base increased from the usual 53 inches to 96 inches.

Another object is to provide such a suspension which will permit the large amount of vertical axle movement required for highway vehicles to provide a vertical ride as soft as load heights will allow and at a low frequency.

Another important object is to provide such a suspension which is substantially free from friction but is controlled by an increased resistance to motion in proportion to the amplitude and velocity of vertical frame movement.

Another important object is to provide such a suspension in which lateral and vertical movement of the unsprung components, as well as a slight movement thereof lengthwise of the vehicle frame, are permitted and resiliently resisted, the lateral and vertical resilience being sufficient, both when the vehicle is loaded and unloaded, to absorb lateral thrust of the axles, particularly resulting from one wheel moving up and down relative to the others, thereby to provide increased safety, tire and gasoline mileage, and stability.

Another object is to provide a gearless compensating means connecting the companion ends of the tandem axles and through which excess load on one wheel is transmitted to its companion wheel.

Another object is to provide such a suspension consisting of compact units which are arranged so as not to interfere with the frame and axle movement and in which the moving parts are arranged immediately inside and close to the wheels and are high enough to provide high and wide support for the body on the axles with resulting increased stability.

Another object is to provide such a tandem axle suspension in which the tandem axles are self-steering so that in rounding a curve the axles automatically assume such position relative to each other as will enable a pure rolling action to be obtained. This object is also achieved on the straightaway when some unbalance, such as one tire being of greater diameter, tends to cause tire scuffing.

Another object is to provide such a suspension which can be removed and replaced, with the axles, walking beams and wheels as a unit, so that field repairs can be avoided and the holdup of trucks for repairs of their suspension can be reduced to a minimum.

Another object is to provide such a tandem axle suspension which can have softer springs than those now on the market for equivalent duty and at the same time have greater sidesway control through high and wide spring mountings.

Another object is to provide such a tandem axle suspension having softer springs than those on the market and which are flexible laterally and fore-and-aft of the vehicle, and in which such flexibility is adequately controlled so as not to be excessive.

Another object is to provide a suspension in which the principal friction bearings can be pre-lubricated for the life of the vehicle.

Another aim is to provide reduced height change of the body, from empty to loaded, preferably keeping this change at about two inches, and at the same time providing a soft, low frequency ride with improved stability and sidesway control.

Another object is to provide such a suspension which can have many years and hundreds of thousands of miles of carefree operation without repairs or servicing.

Other important objects are to provide such a suspension which is very light in weight, particularly in unsprung weight; in which little or no shock absorber control is required; which is low in both initial cost and upkeep; which renders auxiliary devices for the control of sidesway unnecessary; and in which periodic vibration of the suspension is dampened out.

Other objects and advantages of the invention will be apparent from the following description and accompanying drawings in which:

FIG. 2 is a fragmentary top plan view, partly in section, of one side of the suspension shown in FIG. 1, the other side of the suspension being of substantially identical construction.

FIGS. 3 and 4 are fragmentary vertical transverse sections taken generally on the correspondingly numbered lines of FIG. 2, parts being shown in elevation.

FIG. 5 is a fragmentary view similar to FIG. 3 and illustrating a modified form of helical compression spring retainer.

Figure 1:
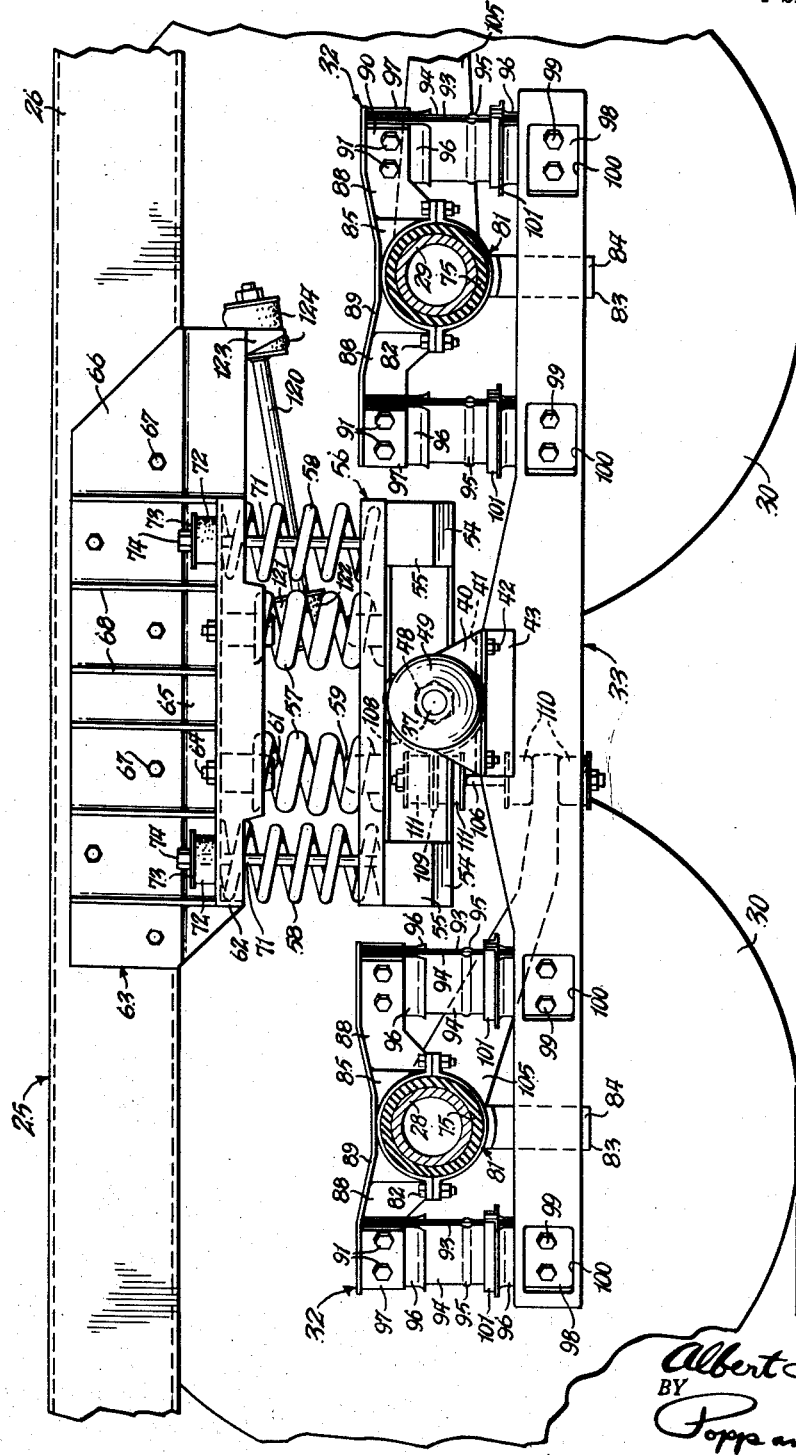
FIG. 1 is a fragmentary side elevation of the rear end of a tandem axle vehicle having a suspension embodying the present invention, the axles being shown in section and the section being taken generally along line 1—1 of FIG. 2.

The invention is illustrated as being in the form of a heavy duty tandem axle suspension for wide bodied, large tired trucks or trailers. As to such wide bodied, large tired trucks, present load laws limit the maximum overall width of highway trucks to 96 inches. Heavy duty trucks have a frame width of 34 inches and with 11 inch spaced dual tires, this leaves only from 5 to 6 inches between the tires and each side of the frame to accommodate the suspension and with the present invention the space must contain large enough helical compression springs to support the load and provision also must be made to accommodate a substantial lateral axle movement, that is, at least 1 inch of axle movement lengthwise of their axes in either direction.

The main frame 25 of the vehicle can be of any suitable construction and is shown as comprising a pair of longitudinal side frame bars in the form of inwardly facing channels 26 which are shown as straight and parallel and are connected by the usual cross bars (not shown).

The frame is shown as supported by a pair of tandem axles 28 and 29 which in turn are supported by wheels 30, these wheels being rotatably secured on these axles. One or both groups can be drive wheels, the axle 28 being the front axle and the axle 29 being the trailing axle.

The construction of the tandem axle spring suspension at the left-hand side of the truck is substantially the same as the tandem axle spring suspension at the right-hand of the truck and hence a description of the spring suspension at one side of the truck will be deemed to apply to both sides, the same reference numerals being used.

Each end of each of the axles 28, 29 is connected by leaf spring shackles, indicated generally at 32, to one end of a walking beam 33, these leaf spring shackles being arranged adjacent the inner faces of the innermost wheels 30 and the walking beam being in part arranged under the corresponding longitudinal side frame bars 26.

Each walking beam 33 is preferably of tubular or box form in cross section having vertical side walls and horizontal top and bottom walls as best shown in FIGS. 3 and 4. The central part of each walking beam preferably projects upwardly and is journalled on a cross tube 34, as follows:

The cross rod or tube 34, in addition to providing the journals for the pair of walking beams 33, also forms a reservoir for a body of oil 35, FIG. 3, which is shown as being sealed in the cross tube. For this purpose a disc 36 is welded in each end of each cross tube and each disc carries a threaded concentric hub 37 projecting outwardly therefrom, the body of this hub also projecting into the cross tube 34 and being suitably supported at intervals by discs 38 which engage the inner surface of the cross tube 34 and are preferably formed so as to permit movement of oil thereby.

Each walking beam has a bearing or rock sleeve 39 journalled on the corresponding end of the cross tube 34. Each rock sleeve 39 can be fixed to its walking beam 33 in any suitable manner, each rock sleeve being shown as having welded thereto two pairs of triangular brackets or braces 40 which have horizontal bottom flanges 41 resting on and secured by bolts 42 to horizontal angle irons 43 projecting horizontally outwardly from opposite sides of the center of the walking beam 33 as best shown in FIGS. 1, 2 and 3.

The bearing or rock sleeves 39 are held against inward displacement by a tubular shell 44 which houses the central part of the cross tube 34 and extends between the opposing ends of the two bearing or rock sleeves 39. The outer threaded end of the hub 37 projects through the central opening of a disc 45 which fits against the corresponding end of the cross tube 34 and also the outer end of the corresponding rock sleeve 39 so as to form an outer thrust bearing held in place by a washer 46, nut 47 and lock nut 48 on the projecting threaded hub 37 and these parts are enclosed and concealed by a hub cap 49 suitably secured to the outboard end of each bearing or rock sleeve 39. In addition an oil seal 50 is provided between the opposite ends of the tubular shell 44 and each rock sleeve 39, this oil seal preferably being in the form of a rubber sleeve embracing the opposing ends of the tubular shell 44 and corresponding rock sleeve 39 and suitably secured to both so as to flex with rocking movement of the rock sleeve 39, but at all times provide a barrier against the escape of oil.

Oil from the body 35 is supplied to the internal bearing surface of each tubular bearing or rock sleeve 39. For this purpose the cross tube 34 can be provided at each end with oil holes 51 leading from its interior to the interior of each rock sleeve 39.

The cross tube 34 is secured within the tubular shell 44 by means of a pair of bolts 52 which are located in equally spaced relation to the inner ends of the rock sleeves or bearings 39 and extend through the top parts of the cross shaft 34 and tubular shell 44. Each of these bolts also extends through the top of a transverse bracket 53 which brackets are preferably also welded to the tubular shell 44 so as to be an integral component thereof.

The brackets 53 extend crosswise of the tube assembly and project from opposite sides thereof, these brackets preferably being of channel shaped form in cross section with their channels opposing each other. Additionally they are preferably welded to the tubular shell 44. The opposite outboard ends of the brackets 53 are welded to beams 54 extending transversely of the chassis and which are preferably of box form in cross section. The ends of these cross beams 54 project over the walking beams 33 and have their ends closed by end heads 55.

Each pair of outboard ends of the cross beams 54 supports a base plate or channel 56 for a group of helical compression springs 57, 58. For this purpose this base plate or channel is preferably in the form of a bottom plate welded to the tops of the cross beams 54 to bridge the space therebetween and having upstanding marginal flanges which embrace the lowermost convolutions of the springs 57, 58. It will be seen that the brackets 53 and cross beams 54 constitute a bolster supporting the spring base plates 56 and that this bolster extends transversely of the frame 25 adjacent the cross rod 34 with its ends extending outwardly from below the main longitudinal side frame beams 26 to above the walking beams 33, and that this bolster is secured to the central part of the cross rod 34 between the bearing sleeves 39 by the bolts 52. The springs 57 are in the form of a pair of relatively heavy helical compression springs the lower coil of which also encircles a cylindrical rubber body 59 secured to the bottom of the spring base plate or channel 56 as by the stud bolt 60 shown in FIG. 3. Similarly the upper convolutions of the heavier center springs 57 encircle a depending cylindrical rubber block 61 secured to the underside of the horizontal extension in the form of an inverted channel 62 of a frame bracket 63. The rubber block 61 can be secured to the frame bracket 63 by a bolt 64 as shown and the horizontal extension or channel 62 is shown as having a depending marginal rim which embraces the upper convolutions of the springs 57, 58. The horizontal extension or inverted channel 62 is secured to an inward offset 65 of a side plate 66 the upper part of which is arranged in face-to-face contact with the corresponding main longitudinal side frame beam 26 and removably secured thereto by a plurality of bolts 67. Desirably the horizontal extension or inverted channel 62 is reinforced by a series of triangular reinforcing plates or gussets 68 welded along their bottom edges to the horizontal extension 62 and along their vertical edges to the vertical attaching plate 66 of the frame bracket 63.

It will particularly be noted that in the normal or unloaded position of the vehicle there is a space 70 between the upper convolutions of each helical compression spring 57 and the underside of the horizontal extension 62 of the frame bracket 63. Accordingly in the unloaded position of the vehicle the chassis is supported wholly by the much lighter helical compression springs 58 which are interposed between the opposite extremities of each spring base or channel 56 and the horizontal extension 62 of the frame bracket 63. These springs 58 are much lighter than the springs 57 so as to impart greater flexibility in the suspension when travelling unloaded. When the vehicle is loaded to the point where the tops of the springs 57 engage the horizontal extension 62 of the frame bracket 63 and are compressed, these heavier springs contribute to the support of the load and become the main resilient supporting members for the loaded chassis.

In order to limit the separating movement of the axles from the frame upstanding rods 71 are fixed to and project upwardly from the opposite ends of each spring base plate or channel 56 through the centers of the light springs 58 and through openings provided in the ends of the horizontal extensions 62 of the frame brackets 63. Above each horizontal extension 62 each rod extends through the center of a rubber cushion 72 and a washer 73 across the top of this cushion. A nut or head 74 at the top of each rod 71 can engage the corresponding washer 73. It will be seen that by this arrangement the rods 71 are tie rods which prevent separation of the tandem axle assembly from the chassis while at the same time the rubber cushions 72 provide resilience and noiselessness when these rods 71 come into operation.

Each axle end is embraced by a rubber sleeve 75 of substantial thickness. This rubber sleeve is in turn embraced by a metal sleeve 76 and the ends of the rubber sleeve protrude beyond the metal sleeve and are compressed against end rings 78 fixed to each axle end. Each metal sleeve 76 is embraced by the semi-circular central part of an axle bracket 80 and by a companion semi-cylindrical metal clamping member 81. The metal clamping member can be secured to the axle bracket by bolts 82 which serve to draw each axle bracket and its semi-circular clamping member into compressive relation with the metal clamping sleeve 76 to hold the axle bracket against rotation relative to the axle except to the limited degree permitted by the rubber sleeve 75. Each clamping member 81 also has an integral downwardly projecting stop 83 providing an outer vertical flat stop face 84 opposing the inner side of the corresponding end of the walking beam 33. The stop 83 is sufficiently heavy and adequately reinforced to limit the lateral movement of the ends of the walking beams 33 to the spaces provided between the walking beams and the stop faces 84. These faces engage only under extreme conditions.

Each axle bracket 80 has a central body part 85 which is of rectangular box-like form in horizontal section and which has opposite arms projecting fore-and-aft with reference to the vehicle. Each arm is T-shaped in cross section, having a vertical web 88 and a top plate 89, the latter extending over both arms as well as the box-like central body part 85. The outer extremity 90 of the vertical web 88 of each arm is angularly disposed to toe in or converge toward the front and center of the vehicle. To one face of each toed-in end 90 of each vertical web 88 is secured, as by bolts 91, the upper end of a corresponding leaf spring shackle 32, these leaf spring shackles thereby also toeing or converging toward the front and center of the vehicle.

As described in greater detail in my said copending application, Serial No. 794,083, each of these leaf spring shackles 32 comprises a flat central spring leaf 93 flanked by a pair of full length spring leaves 94 each of which has an outwardly protruding corrugation 95 at its center. These leaves 94 are in turn flanked at each end by a pair of shorter spring leaves 96 which preferably diverge from each other toward the center of the shackle. The bolts 91 extend through the upper ends of the leaves 93, 94, 96 and a clamping plate 97 and anchor in the angularly disposed or toeing-in extremities 90 of the vertical webs 88 of the axle brackets. The upper edge of each clamping plate 97 is shown as welded to the underside of the top plate 89 as illustrated in FIG. 4.

The lower end of each shackle extends through a hole in the top wall of the walking beam 33 into the interior thereof and fits between a pair of spaced vertical webs 98 welded in each walking beam. Bolts 99 extend through and clamp the lower ends of the leaves 93, 94, 96 between the webs 98, access to these bolts being had through access holes 100 in the sides of the walking beam. Small angles 101 can be secured to each shackle, preferably in clamping relation thereto, above the divergent ends of the outer leaves 96 at the bottom of each shackle 32 to prevent solids from filling the crevice produced by their diverging upper ends.

The transverse corrugations or offsets 95 at the centers of the leaves 94 flank the center leaf 93 to accommodate the situation where one of the four dual wheels 30 rises relative to the other three. Thus, if there were only lateral movement of the leaf spring shackles 32 transversely of the plane of the center leaf 93, the flanking leaves 94 could be straight and the corrugations 95 would be unnecessary. However, when one dual wheel 30 and its axle end rises relative to the other three, one flanking leaf 94 is placed under tension and the other placed under compression and corresponding elongation and shortening of these leaves 94 relative to each other must take place. This is, of course, permitted by the corrugations 95. These two flanking leaves 94 are fully effective in resisting forces which are fore-and-aft with respect to the vehicle and are also fully effective if the center leaf 93 should break.

The suspension is shown as including axle torque arms 105 which are effective against brake and drive torque reactions. Each arm 105 is welded to a corresponding axle 28, 29 near the center thereof to project generally horizontally toward the rear of the vehicle. The torque arm 105 of the front tandem axle 28 can be connected by a generally vertical rod 106 to the cross tube shell 44, this cross tube shell having welded thereto for this purpose a semi-cylindrical bracket 108 having a horizontal forwardly projecting tongue 109 through which the vertical rod 106 extends. Preferably the vertical force of this torque arm is transmitted through a pair of rubber cushions 110 and the vertical force of this rod is delivered to the bracket 108 through a pair of rubber cushions 111.

The outboard end of the rear torque arm 105 is shown as connected to a cross bar 113 of the frame by a vertical rod 114. Preferably the vertical force of this torque arm is transmitted through a pair of rubber cushions 115 and the vertical force of this rod is delivered to the cross frame bar 113 through a pair of cushions 116.

The coil springs 57, 58 do not materially restrict movement of the unsprung portion of the suspension, including the walking beams 33 and their cross shaft 34, lengthwise of the vehicle. To provide a cushioned resistance to such movement, radius rods 120 are provided at each side of the vehicle. For this purpose an upstanding bracket 121 is welded to one end of each transverse beam 54 flanking and fixed to the tubular shell 44 for the cross tube 34 on which the walking beams 33 are journalled. One end of each radius rod 120 extends through a corresponding bracket 121 and the horizontal force from each bracket to its radius rod is transmitted through a pair of rubber cushions 122. The opposite end of each radius rod 120 extends through a frame bracket 123 in the form of a downward extension of one end of the frame bracket 63. The force from each radius rod 120 is delivered to the frame bracket 123, 63 through a pair of rubber cushions 124.

The coil springs 57, 58 do not materially restrict movement of the unsprung portion of the suspension, including the walking beams 33 and their cross shaft 34, transversely of the vehicle. To provide a cushioned resistance to such movement a radius rod 130 is arranged above and generally parallel with the cross tube 34 on which the walking beams are journalled and its tubular case or shell 44.

This radius rod 130 at one side of the vehicle extends through an upstanding bracket 131 rising from the center of one of the brackets 53 secured to the tubular shell 44 for the cross tube 34.

The horizontal force from this bracket 131 is transmitted to the radius rod 130 through a pair of rubber cushions 132. The opposite end of this radius rod extends through a frame bracket 133 and the force from the radius rod 130 is delivered to the frame bracket 133 through a pair of rubber cushions 134.

*Operation*

In the operation of the suspension, the upward movement of one end, say, the front tandem axle 28, effects upward movement of the T-shaped axle bracket 80 fixed thereon thereby to place the corresponding pair of leaf spring shackles 32 under tension to effect upward movement of the front end of the corresponding walking beam 33. This force through the leaf spring shackles is essentially transmitted through the center leaf 93 thereof. The corrugations 95 in the leaves 94 which flank the central spring leaf 93 permit the required elongation of one leaf 94 and shortening of the other leaf 94 when one axle end rises relative to the other axle ends which is the condition assumed in this description of the operation.

This upward movement of the forward end of the walking beam 33 raises its rock sleeve 39 (FIG. 3) at the center of the walking beam and which is journalled on the corresponding end of the cross tube 34. This bearing is supplied with lubricant from the body 35 of oil in the cross tube via the bottom holes 51 therein and the body of oil 35 is held against escape by the disc 36 and flexible oil seal 50. This bearing mounting of the rock sleeve 39, which is fast to the center of the walking beam 33, permits the assumed upward movement of the front end of the walking beam and also transmits this upward movement to the corresponding end of the cross tube 34.

This upward movement of one end of the cross tube 34 and the tubular shell 44 which houses this cross tube, is transmitted to the transverse bracket 53 mounted on this end of the cross tube 34 through the bolt 52. The upward movement of the transverse bracket 53 effects upward movement of the corresponding ends of the square tubular bars 54 which extend transversely out of the vehicle frame as best shown in FIG. 2, these brackets and bars constituting a bolster. This raises the base plate or channel 56 supporting the two groups of helical compresison springs 57, 58 which are seated in this base plate or channel as best shown in FIG. 1.

Assuming that the chassis is unloaded, at this time the heavy or central pair of helical compression springs 57 are not in contact with the axle bracket 63. Accordingly, in this upward movement of the base plate or channel 56, no force is transmitted through these heavy or central pair of compression springs, and they are merely moved toward contact with the underside of the horizontal extension or inverted channel 62 forming part of the axle bracket 63. In this movement, the free upper ends of this heavy or central pair of helical compression springs 52 are guided by the rubber cylinders 61 as best shown in FIG. 3.

Accordingly, the force resulting from the upward movement of the base plate or channel 56 is transmitted through the light or outermost pair, lengthwise of the vehicle, of helical compression springs 58 to the outboard or horizontally extending inverted channel portion 62 of the frame bracket 63. These outermost or relatively light helical compression springs 58 are, of course, compressed during this action and provide resilient support for the unloaded truck to provide a first stage of resilient resistance through relatively light springs which provide the desired frequency and action for the empty truck. In this action, the upstanding tie rods 71 rise and the nuts or heads 74 at the upper ends of these tie rods leave and rise from the washers 73. On the return movement of the axle and these nuts or heads 74 can re-engage these washers 73, the force being cushioned by the rubber cushions 72 which support these washers 73.

Assuming that the truck is carrying a load or that the assumed upward movement of the one end of the front axle 28 is of sufficient magnitude, the upward movement of the corresponding base plate or channel 56 for the group of helical compression springs 57, 58 will cause the upper ends of the heavier or central pair of helical compression springs 57 to engage and transmit force to the outboard or horizontal inverted channel portion 62 of the axle bracket 63. Accordingly, the loaded chassis 25 is now resiliently supported by the second stage of heavier helical compression springs 57 in addition to the lighter first stage of helical compression springs 58 to provide the required increased resilient resistance for supporting the load on the axles. The size and strength of the springs 57 and 58 are selected to provide the spring rate and amplitude of movement best suited to the empty vehicle and to the load to be carried by the vehicle.

It will be noted that this action of the suspension is substantially friction free, the only friction being that of the rock sleeves 39 on the cross tube 34, the action of the helical compression springs 57, 58 being free from friction.

Lateral cushioning of the axles 28, 29 is provided by the leaf spring shackles 32. Thus, either axle can move lengthwise of its axis, this being permitted by the leaves of these leaf spring shackles, and these leaf spring shackles yieldingly return the chassis to centered relationship when normal conditions are restored. It will be noted that since the leaf spring shackles 32 are between the axles and the walking beams, there is minimum inertia resistance to such lateral movement of the axles, the only inertia being that of the individual axles themselves.

The amount of such lateral movement of each axle is positively limited. Thus, excessive movement of either axle lengthwise of its axis will cause its stop 83, 84 (FIG. 4) to engage the corresponding walking beam 33. The tires are thereby prevented from being cut by contacting any part of the suspension.

As with my said copending application, the axles are also self-steering, that is, they move laterally to trail the steering wheels and to trail each other as the vehicle is steering around curves and in and out of traffic. This self-steering is obtained through the angularity, in a horizontal direction, of the leaf spring shackles 32. Thus, as best shown in FIG. 2, the leaves of these leaf spring shackles toe in or converge toward the front of the vehicle, the leaves of the leaf spring shackles at each side of the vehicle being parallel.

When the vehicle makes a turn in the road, the tires of each of the axles 28, 29 tend to resist the scuffing which would otherwise occur and in doing so push each axle laterally of the frame to eliminate the scuffing. Confining attention to the front axle 28, this lateral or axial movement on making a turn displaces the upper ends of the four pairs of leaf spring shackles 32 horizontally, these leaf spring shackles at one side of the vehicle being displaced horizontally toward the frame 25 and at the other side of the vehicle being displaced away from the frame. Since these shackles 32 are set at an angle and since the shackles at opposite sides of the vehicle are set at opposite angles in a horizontal direction so that the leaves of all the shackles toe in toward the front of the vehicle, it will be seen that such an assumed lateral movement of the front axle 28 causes one of its ends to be displaced forwardly and its other end to be displaced rearwardly.

It will therefore be seen that such endwise displacement of each tandem axle 28, 29 will cause a corresponding opposite displacement, fore-and-aft of the frame, of the opposite ends thereof. Thus, fore-and-aft displacement of the two tandem axles 28 and 29 is such that in rounding a curve and with such endwise displacement of the axles 28, 29 to avoid tire scuffing, both of the tandem axles are caused to steer in the direction corresponding to the turn being made by the vehicle. Thus, when the vehicle is steered to the right, the front end of the body moves about a theoretical pivot intermediate the tandem axles. This causes a lateral movement of the body in opposite directions relative to the two tandem axles, the body movement being to the right relative to the front tandem axle 28 and the left relative to the rear tandem axle 29. This causes the left-hand end of the front tandem axle 29 to move forwardly and the right-hand end of this front tandem axle to move rearwardly. This also causes the left-hand end of the rear tandem axle 29 to move rearwardly and the right-hand end of the rear tandem axle to move forwardly. The movement therefore tends to bring the axes of the tandem axles 28, 29 so as to intersect the axis of the front steering wheels (not shown) and thereby enable the truck to make the turn without tire scuffing. Equally important is that the self-steering feature tends to hold the wheels in perfect rolling alinement when travelling straight ahead. This self-steering action also takes place to some extent when a tendency to tire scuffing occurs because of one wheel or a pair of wheels having a diameter different from the diamter of the wheel or pair of wheels at the other side of the same axle.

To restrain the unsprung components of the suspension against movement fore-and-aft of the vehicle and at the same time to provide a limited resilient resistance to such movement, the radius rods 120 are provided at each side of the vehicle. These radius rods extend lengthwise of the line of movement of the vehicle and each is connected at one end, through the pair of rubber cushions 124 to a frame bracket extension 123 of the corresponding main frame bracket 60. The opposite end of each of these radius rods 120 is connected, through a pair of rubber cushions 122 to a bracket 121 fixed to one of the tubular cross bars 54 connected by the brackets 53 to the cross tube 34 and its tubular shell 44. It will therefore be seen that movement of the unsprung components of the spring suspension fore-and-aft of the vehicle frame 25 is resisted by these radius rods 120 at opposite sides of the vehicle but that the rubber cushions 122 and 124 associated with these radius rods cushion their action so as to provide a degree of resilient resistance in their action.

In similar manner, movement of the unsprung components of the tandem spring suspension transversely of the chassis is resisted by the transverse radius rod 130 in such manner as to cushion this restraining action. Thus this radius rod 120, as best shown in FIG. 3, is connected to the frame bracket 133 through a pair of spring cushions 134 while its other end is connected to the bracket 131 on the cross tube 34 and its tubular shell 44 through the pair of rubber cushions 132. This radius rod thereby restrains the cross tube 34 and its shell 44 against axial movement but in a cushioned manner, thereby similarly to restrain movement of all of the unsprung components of the vehicle.

The torque arms 105 fixed to each axle 28, 29 adequately resist all brake and drive torque reactions and through the rod and rubber cushions 106, 110 and 111, and 114, 115, 116 does not resist axle movement in any direction, this being under control of the suspension.

By the high and wide mounting for the helical compression springs 57, 58, excellent sidesway control and stability is achieved even with the soft, low frequency ride which these springs provide.

In FIG. 5 is illustrated a modified form of retainer for each of the heavier pair of helical compression springs 57. As previously described, under empty body conditions, the tops of these springs are out of contact with the underside of the outboard horizontal inverted channel portions 62 of the frame brackets 63. This removes these heavier springs from action when travelling along without a load and these springs come into action when the chassis is loaded sufficiently to lower its frame brackets 62, 63 into contact with these heavier helical compression springs 57 to be supported thereby. However, when travelling along with an empty body, it will be seen from an inspection of FIG. 3 that these heavier helical compression springs are to some extent free to jump up and down and possibly produce clatter or undesirable noise. The purpose of the modified form of spring retainer shown in FIG. 5 is to avoid such possible clatter or noise of these springs 57 in travel with an empty body.

The numeral 135 represents a sheet metal cup set into the upper part of each of the helical compression springs 57 and having a radially outwardly extending rim 156 supported on the upper convolution thereof. Within this cup is arranged a small helical compression spring 138 which protrudes upwardly therefrom and is in pressure contact with the underside of the outboard inverted channel portion 62 of the frame bracket 63. Desirably this spring 138 is held centered by a cylindrical rubber body 139 which its upper end surrounds, this being preferably secured to the frame bracket 62, 63 by a bolt 140. It will be seen that the small helical compression spring 138, through the cup 135, exerts a continuous downward pressure on its helical compression spring 57 thereby to prevent the latter from jumping up and down when travelling with an empty body and possibly producing noise. At the same time, the centering rubber body 139 enters the cup 135 when its spring 57 is compressed.

From the foregoing it will be seen that the present invention achieves the objects and has the advantages set forth, and is a sturdy low-cost suspension free from upkeep and service problems.

I claim:

1. A tandem axle spring suspension adapted to be interposed between a vehicle frame and a pair of tandem axles each having wheels journalled at the ends thereof, comprising a walking beam arranged at each side of said frame and extending lengthwise thereof, to a horizontal cross rod extending transversely of said frame with its ends arranged adjacent the central parts of said walking beams, bearing means journalling the ends of said cross rod on said central parts of said walking beams to support said cross rod on said walking beams for oscillation of said walking beams about a horizontal axis extending transversely of said frame, a bolster extending transversely of said frame adjacent said cross rod with its ends extending outwardly from below said frame to above said walking beams, means securing said cross rod to said bolster to support said bolster on said cross rod, a frame bracket fixed to and projecting horizontally outwardly from each side of said frame above each of said ends of said cross rod, a pair of vertical, relatively light helical compression springs arranged at each side of the vehicle one in advance of the other lengthwise of the vehicle between and in continuous pressure contact with the adjacent end of said bolster and corresponding frame bracket substantially equidistant from said axis and yieldingly supporting said frame on said bolster under all load conditions, a pair of vertical, relatively heavy helical compression springs arranged at each side of the vehicle one in advance of the other lengthwise of the vehicle and interposed between the adjacent end of said bolster and the adjacent frame bracket substantially equidistant from said axis and also interposed between said pair of vertical, relatively light helical compression springs and being of shorter effective length than said relatively light helical compression springs to have one end convolution out of operative contact under no load conditions and to come into action when a load is applied to said frame, means movably conecting each end of each walking beam to a corresponding axle end, and guide means operatively interposed between said bolster and frame and constraining said frame to move in a substantially vertical path.

2. A tandem axle spring suspension adapted to be interposed between a vehicle frame and a pair of tandem axles each having wheels journalled at the ends thereof, comprising a walking beam arranged between said wheels and frame at each side of said frame and extending lengthwise thereof, a horizontal cross rod extending transversely of said frame with its ends arranged adjacent the central parts of said walking beams, bearing means journalling said ends of said cross rod on said central parts of said walking beams, a bolster extending transversely of said frame adjacent said cross rod with its ends extending outwardly from below said frame to above said walking beams, means securing the central part of said cross rod, between said bearing means, to said bolster, a spring base plate fixed to each end of said bolster and extending lengthwise of and above said walking beams and above each of said ends of said cross rod, a row of vertical helical compression springs having their bases supported on each base plate to form a progression extending lengthwise of the corresponding walking beam above the corresponding end of said cross rod, frame brackets fixed to and projecting horizontally outwardly from opposite sides of said frame above said ends of said cross rod and supported on the upper ends of said helical compression springs, and means movably connecting each end of each walking beam to a corresponding axle end.

3. A tandem axle spring suspension as set forth in claim 2 wherein there are at least three helical compression springs in each of said rows.

4. A tandem axle spring suspension as set forth in claim 3 wherein the endmost helical compression springs of each row are lighter than the remaining springs of said rows and wherein said endmost helical compression springs are in continuous pressure contact with said spring base plates and frame brackets, and wherein said remaining springs are of shorter effective length than said lighter endmost helical compression springs to have one end convolution out of operative contact under no load conditions and to come into action when a load is applied to said frame.

5. A tandem axle suspension as set forth in claim 2 additionally including a generally horizontal radius rod at each side of said frame and extending lengthwise of the line of travel thereof, means pivotally connecting one end of each radius rod with said frame, and means pivotally connecting the other end of each radius rod with the corresponding end of said bolster.

6. A tandem axle suspension as set forth in claim 5 wherein a cushion of soft, resilient plastic material is operatively included in at least one of said pivotal connecting means.

7. A tandem axle suspension as set forth in claim 2 additionally including a generally horizontal radius rod extending generally parallel with said axles, means pivotally connecting said radius rod at one end to one end of said bolster, and means pivotally connecting the other end of said radius rod to the opposite side of said frame.

8. A tandem axle suspension as set forth in claim 2 wherein a cushion of soft, resilient plastic material is operatively included in at least one of said pivotal connecting means.

9. A tandem axle spring suspension adapted to be interposed between a vehicle frame and a pair of tandem axles each having wheels journalled at the ends thereof, comprising a walking beam arranged at each side of said frame and extending lengthwise thereof, a horizontal cross rod extending transversely of said frame with its ends arranged adjacent the central parts of said walking beams, bearing means journalling the ends of said cross rod on said central parts of said walking beams to support said cross rod on said walking beams, a bolster extending transversely of said frame adjacent said cross rod with its ends extending outwardly from below said frame, means securing said cross rod to said bolster to support said bolster on said cross rod, a row of vertical helical compression springs having their bases supported on each end of said bolster to form a progression extending lengthwise of the corresponding walking beam, frame brackets fixed to and projecting horizontally outwardly from opposite sides of said frame above said ends of said cross rod and supported on the upper ends of said helical compression springs and means movably connecting each end of each walking beam to a corresponding axle end.

10. A tandem axle spring suspension as set forth in claim 9 additionally including a least one generally horizontal radius rod extending lengthwise of the line of travel of the vehicle, means pivotally connecting one end of said radius rod with said frame, and means pivotally connecting the other end of each radius rod with said bolster.

11. A tandem axle spring suspension adapted to be interposed between a vehicle frame and a pair of tandem axles each having wheels journalled at the ends thereof, comprising a walking beam arranged at each side of said frame and extending lengthwise thereof, a horizontal cross rod extending transversely of said frame with its ends arranged adjacent the central parts of said walking beams, bearing means journalling the ends of said cross rod on said central parts of said walking beams to support said cross rod on said walking beams, a bolster extending transversely of said frame above said cross rod with its ends extending outwardly from below said frame above said walking beams, means securing said cross rod to said bolster to support said bolster on said cross rod, frame brackets fixed to and projecting horizontally outwardly from opposite sides of said frame above each of said ends of said cross row, a row of vertical helical compression springs having their bases supported on each end of said bolster to form a progression extending lengthwise of the corresponding walking beams, the upper ends of each row supporting the adjacent frame bracket, means connecting each end of each walking beam to a corresponding axle end in a vertical plane between said frame and wheels, said axles and cross rod lying substantially in a common horizontal plane and a radius rod extending lengthwise of said frame and pivotally connected at its opposite ends to said bolster and frame.

References Cited in the file of this patent

UNITED STATES PATENTS

| | | |
|---|---|---|
| 110,497 | Potts | Dec. 27, 1870 |
| 255,200 | Schoen | Mar. 21, 1882 |
| 2,193,567 | Pointer | Mar. 12, 1940 |
| 2,456,719 | Martin | Dec. 21, 1948 |
| 2,493,004 | Mackie | Jan. 3, 1950 |
| 2,493,025 | Pointer | Jan. 3, 1950 |
| 2,743,939 | Reid | May 1, 1956 |